INVENTOR.
Monroe E. Evans

May 30, 1972 — M. E. EVANS — 3,666,498
TERMINAL HEATING PROCESS FOR FREEING FEED
INGREDIENTS OF SALMONELLA
Filed Sept. 15, 1969 — 2 Sheets-Sheet 2
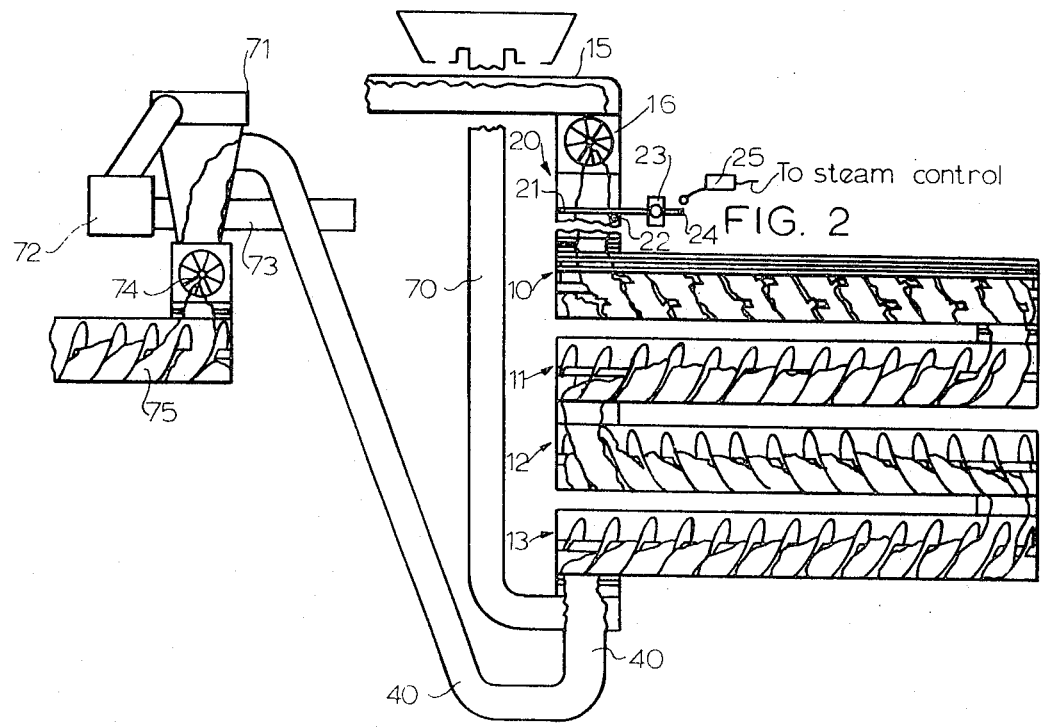
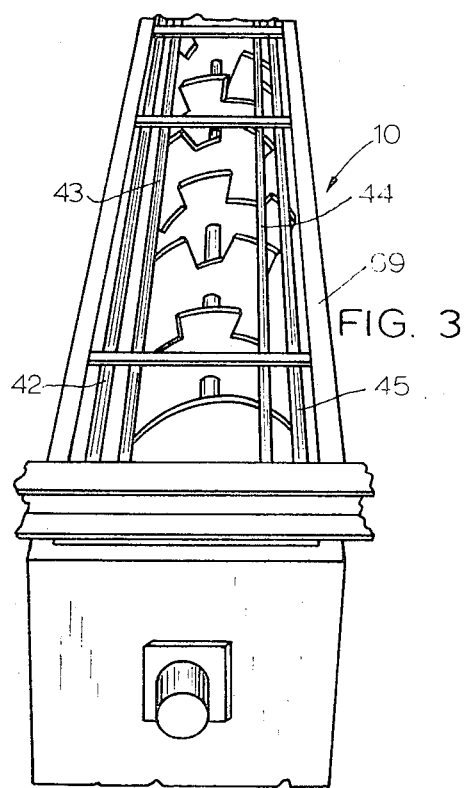
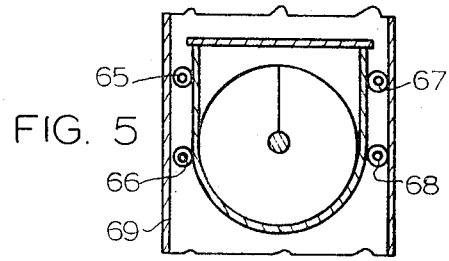
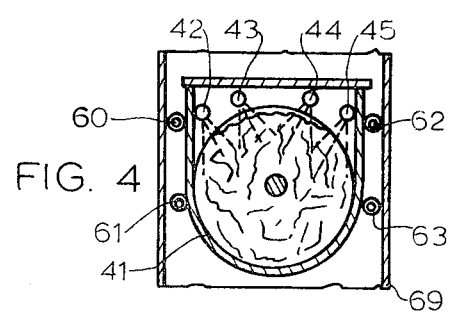
INVENTOR.
Monroe E. Evans
BY
B. B. Olive
ATTORNEY

United States Patent Office 3,666,498
Patented May 30, 1972

3,666,498
TERMINAL HEATING PROCESS FOR FREEING FEED INGREDIENTS OF SALMONELLA
Monroe E. Evans, Fayetteville, N.C., assignor to Cape Fear Feed Products, Inc., Fayetteville, N.C.
Continuation-in-part of application Ser. No. 572,115, Aug. 12, 1966. This application Sept. 15, 1969, Ser. No. 857,837
Int. Cl. A23k 3/00; A23l 3/18
U.S. Cl. 99—216
6 Claims

ABSTRACT OF THE DISCLOSURE

A continuous, large volume terminal heating process for freeing ground, high fat and high bulk density, organic feed meal particles of salmonella without affecting moisture and nutritional content or the particle form includes steps of flash heating while tumbling the particles in dry steam to elevate their temperature, movement of the particles while maintaining them at the elevated temperature, and while continuing movement bringing the temperature down to a level at which there is no tendency for the particles to cake.

CROSS REFERENCE TO RELATED APPLICATION

The present invention relates to and forms a continuation-in-part of an application having the title Process for Freeing Feed Ingredients of Salmonella, Ser. No. 572,115 filed by Monroe E. Evans on Aug. 12, 1966 now abandoned. The present invention and the subject copending application are related in that both applications are based on use of injected dry steam and controlled, timed, heat, cooling and moving steps to effectively kill salmonella in feed meal particles.

BACKGROUND OF THE INVENTION (1) Field of the invention

This invention relates to a heat process for destroying salmonella, i.e. virus and bacteria, in feed material of particle form and particularly to such processes which are for continuous, large volume as opposed to batch, discontinuous or small volume, for maintaining particle character as opposed to forming cakes and for maintaining nutritional and moisture values.

(2) Description of the prior art

Salmonella is a generic term used to describe a collection of over 1600 serotypes of viruses and bacteria which are toxic to humans and selected stock animals. The problem of salmonella control and its seriousness to humans is discussed in a phamphlet entitled "Salmonella Surveillance" which was published Nov. 30, 1965, by the United States Department of Health, Education, and Welfare as Report No. 43 and in a pamphlet entitled "Sanitation Guidelines for Salmonella Control" which was published in May 1965 by the United States Department of Agriculture as ARS 91–51. The problem of salmonella control as well as the harm it may cause and the sources of the same was covered in detail during the National Conference on Salmonellosis held Mar. 11–13, 1964. The proceedings of this conference were published in March 1965 and are identified by "Public Health Service Publication No. 1262." In that publication, the role of the animal feed industry in the control of salmonella was dealt with exclusively on pages 161 to 164. Feed meals, which are to be fed to chickens and other stock animals, are easily contaminated with salmonella during manufacturing through improper handling, improper exposure and the like. Feed meals as contemplated by this invention includes organic animal, marine and vegetable products which have been ground or otherwise reduced in particle size and are particle form prior to being treated by the process of this invention. Particle size may range between 20 mesh and ¼ inch. Moisture content of the particles as introduced may range between 1% and 12%. Bulk density, between 25 lbs. per cubic ft. and 50 lbs. per cubic ft., and fat content between 2% and 20%.

The salmonella most often does not affect the stock animals but is retained by them and is passed to humans to whom the salmonella is toxic. Therefore, it can be seen that the stock animals act essentially as a carrier for the salmonella although they are not diseased by it. While salmonella detection is old as to some serotypes, only recently have methods been provided which give conclusive results upon analysis and only in the relatively recent past have many of the now known serotypes been identified. For example, in 1960 there were perhaps only about 200 identified serotypes of salmonella. The standard procedure for detecting salmonella is disclosed in the United States Department of Health, Education, and Welfare manual entitled "Bacteriological Analytical Manual," second edition, published January 1969. A salmonella-free material as used herein is that processed material in which the presence of presently identifiable serotypes of salmonella are not detectable when sampled by procedures outlined in ARS 91–51 and subjected to laboratory examination as outlined in the "Bacteriological Analytical Manual." However, this method is very time consuming and it is generally a period of days before conclusive results are available.

From the above it can be seen that it is not practical to analyze each batch of feed meal manufactured. Large plants which produce several tons of the feed material daily have no means to store the various batches of feed material while waiting for the results of the salmonella tests. Furthermore, the storing of large quantities of feed meal in the same container would result in the contamination of the lot if any salmonella were present for salmonella spreads rapidly through any like mass of material. To date, the only practical way for obtaining a salmonella-free feed meal has been to eliminate the salmonella as a step in the manufacture of the feed meal and prior to shipment to the customers and to randomly examine selected samples thereof.

Some heat processes have been found which are said to be effective to kill insects in grain, to sterilize and to kill spores and the like in flour, grain, liquid egg, raw fish and other materials. However, these processes are expensive to operate, are generally batch and non-continuous processes, small volume of a few pounds per hour and are not effective to kill salmonella in ground, organic feed meals on a quantity scale. In some of the prior art processes the material, e.g. flour, is required to be agitated and mixed with air or another gas before processing. In other processes the material, e.g. raw fish, is required to be compressed or compacted before processing. Other processes are directed to non-ground, non-organic forms, e.g. grains of heat. Thus prior art processes have not dealt with destroying salmonella in feed meal materials in ground particle form and where the material is processed as a free, flowing stream of particles.

Forced hot air and infrared heating processes have been tried but both have been found unsatisfactory. Hot air when forced through bin stored feed meal effects evaporation and thus reduces moisture content and changes nitritional assays both of which are high undesirable changes in the material. Furthermore, vibrating tables in the presence of infrared heat, forced hot air or steam have been found to be highly ineffective. For example in one experiment which led to the present invention it was found that when organic feed meal particles were placed on a vibrating table, infrared heat would not penetrate more than about ¼" and if tumbled the temperature on the top of the material would instantaneously drop from 190° F. to 110° F.

Applicant's copending application discloses a continuous, large volume process which has proven both economical and practical for eliminating salmonella in ground, organic feed meals of high bulk density and high fat content without destroying the particle character, lowering the nutritional values or increasing the moisture content. The first step in the process of the copending application is repeated in the process of the present application namely that of tumbling and moving the particles in an enclosed horizontal, insulated tubular receptacle while subjecting them for a short time period to an atmosphere exclusively of live dry steam and rapidly bringing the particles to a minimum temperature of 165° F. In the process of the copending application the particles are in the escond step continuously fed to an enclosed, insulated, externally heated vertical bin receptacle which forms a continuation of the first tubular receptacle and in which the particles are kept moving as particles but as a mass and while being held at 165° F. Finally, the particles are continuously withdrawn and while kept moving in subsequent enclosed receptacles are cooled down to 120° F. before being stored or otherwise brought to rest.

SUMMARY OF THE INVENTION

The terminal heating process of the invention is directed to freeing ground, high bulk density and high fat content, organic feed meals of presently identified forms of salmonella according to present methods of test and identification. Furthermore, it is directed to receiving such material in particle form, in a free flowing, gravity fed stream at ambient temperature. The particles are not required to be compacted, pressurized, mixed with pressurized air or other gas, or broken up by agitators prior to entering the first stage of the process of the invention. The process is a continuous and large volume (thousands of pounds/hour) process and neither destroys the nutritional value or raises the moisture content.

During all stages of the process the material retains its particle character and is kept under positive mechanical movement in enclosed receptacles. In the first step the material particles are injected with dry, live steam in an enclosed, insulated, horizontal, heated, tubular receptacle, are tumbled continuously and in a very short time period, e.g. two to two and one-half minutes, are brought to a minimum temperature of between 165° F. to 180° F. depending on the nature of the contamination, the density and type of organic, ground feed material being processed. Most ground feed materials adapted to the invention and forms of salmonella are regarded as requiring a minimum temperature of 180° F. in the first step. In the next step, the material is positively moved through a series of connected, enclosed, insulated, heated receptacles which hold the material at a minimum temperature of between 165° F. to 180° F. for a substantially longer period than the initial steaming period, e.g. eight to ten minutes. The material is finally cooled down to 120° F. while being kept in motion in continuing enclosed receptacles and before being sacked or otherwise processed in a static state.

With the foregoing in mind, the general object of the process of the present application is to improve on the process of the copending application. More specifically, the object of the present process is to provide a faster and therefore larger volume process than the prior process and a process which utilizes substantially less floor space.

DESCRIPTION OF THE DRAWINGS

FIG. 2 is a somewhat schematic diagram of the material flow through the process.

FIG. 3 is a perspective view of a modified cut and fold type heated and insulated screw conveyor suited to injecting dry steam, tumbling and rapidly advancing the material particles in the first process step.

FIG. 4 is an enlarged sectional view of the steam injection and tumbling screw conveyor of FIG. 3.

FIG. 5 is an enlarged sectional view of the typical heated and insulated screw conveyor used to slowly advance the material and maintain its temperature after it has been flash heated by dry steam injection in the first tumbling conveyor.

DESCRIPTION OF THE PREFERRED EMBODIMENT

Figure 1:
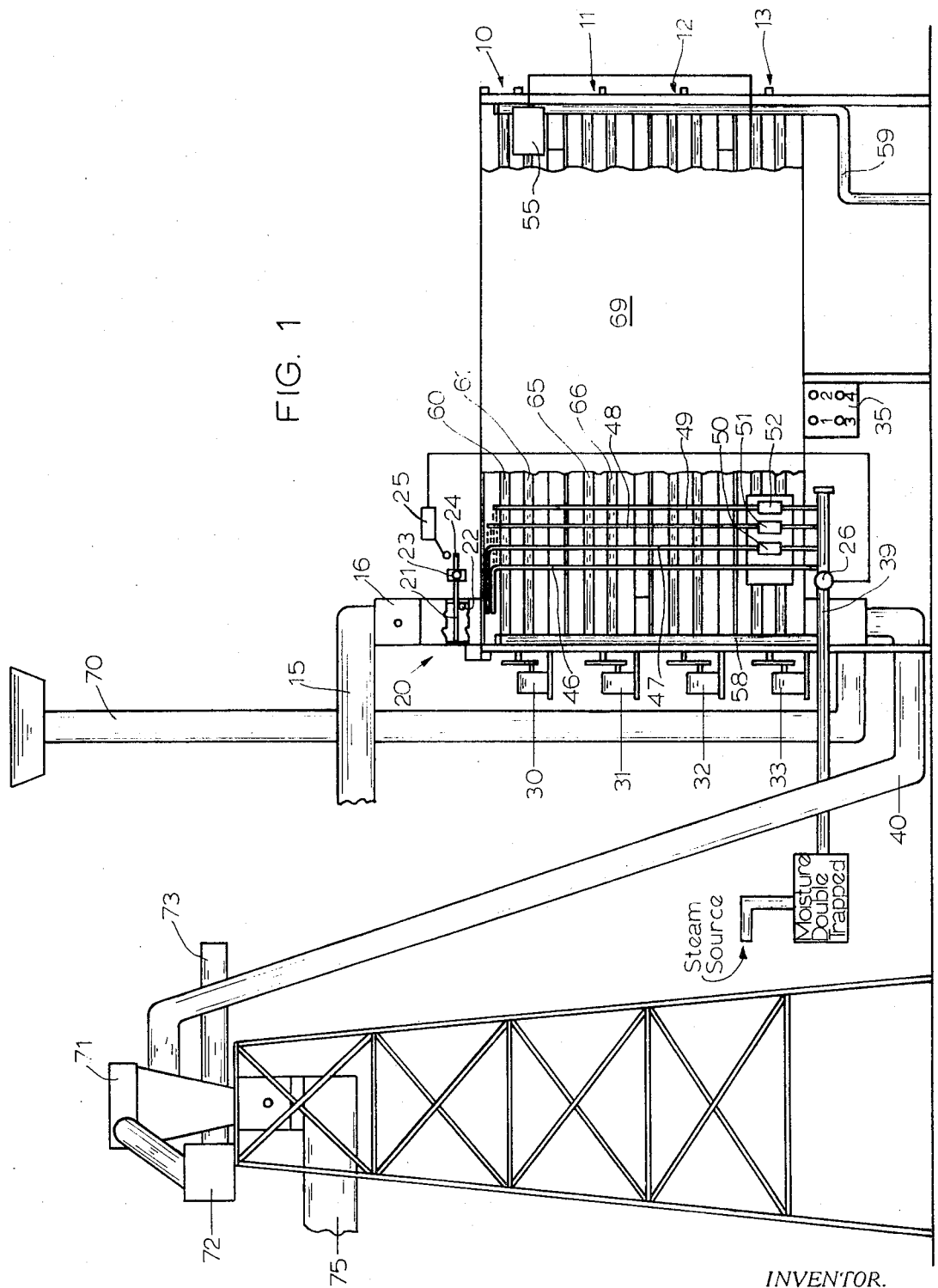
FIG. 1 is a side elevation, partially schematic, view of an apparatus suited to the invention.

Referring to the drawings the process utilizes a heating apparatus which comprises four heated screw conveyors 10, 11, 12 and 13. Conveyor 10 is a "cut and fold" type conveyor and is designed to tumble the feed particles while rapidly advancing the mass of particles axially or longitudinally of the conveyor. Ground, organic, feed material often of high bulk density and high fat content at ambient temperature is fed in particle form and in a free flowing stream from a suitable source generally represented by intake pipe 15. Pipe 15 connects to a so-called air-lock 16 which is basically understood, by those skilled in the art, as being a paddle wheel arrangement which fills with the material on one side, is continuously rotated mechanically and dumps on the other side to thereby minimize the amount of ambient and possible salmonella contaminated air entering the process. Material discharged from air-lock 16 is directed onto a flopper valve 20. Valve 20 basically consists of a baffle plate 21 which tilts on a suitable pivot schematically shown at 22 and operates against the force of an adjustable weight 23 mounted on an external arm 24. Tilting of arm 24 controls operation of valve control switch 25. Switch 25 in turn controls steam valve 26 which controls injection of steam into the material in conveyor 10. Weight 23 is adjusted to counter-balance the bulk density so that with a substantially uniform flow, the weight of material across plate 22 will keep valve 26 on and the steam injection operating uniformly.

Each conveyor has its respective electric motor drive 30, 31, 32 and 33 and an electric control box 35. The conveyors are stacked vertically as shown. Conveyor 10 discharges to conveyor 11, conveyor 11 to conveyor 12, conveyor 12 to conveyor 13 and conveyor 13 to a discharge pipe 40 later discussed. In this regard it will be observed that a substantially long exposure to heat may be contained with a minimum floor space requirement.

Conveyor 10 has a "cut and fold" configuration as shown in FIG. 3. Internally of the horizontally positioned, tubular receptacle 41 of conveyor 10 there are mounted four steam injection pipes 42, 43, 44 and 45 which extend the length of conveyor 10 and which have numbers of spaced steam exit holes along the length of each pipe. The injection pipes receive dry live steam from a main double trapped line 39 through supply pipes 46, 47, 48, and 49. Supply pipe 46 receives live dry steam preferably at 350° F. whenever valve 26 is open and supply pipes 47, 48 and 49 have individual temperature controlled valves 50, 51 and 52 which are controlled by a temperature sensor 55. Temperature of the material is measured and recorded by sensor 55 with a thermometer in the stream as the material flows out of conveyor 10 into conveyor 11 and when main valve 26 is initially opened, valves 50, 51, 52 are also opened but valves 50, 51, 52 are selectively cut out as the measured temperature of the material at the end of conveyor 10 reaches levels of 190° F., 200° F., and 210° F. Thus, at 210° F. measured temperature only one of steam injection pipes 42, 43, 44, 45 is in operation whereas when the material first starts flowing and the measured temperature is below 190° F. all four of the steam injection pipes are operational. In this manner the actual mean temperature of the mass of particles as measured at the end of their travel in conveyor 10 is always brought to at least 165° F. and preferably at least 180° F. before the particles exit from conveyor 10.

All of the screw conveyors 10, 11, 12 and 13 are kept heated by steam pipes or other sources of external heat. Such steam pipes are fed from a supply pipe 58, exhaust through a line 59 and are indicated at 60, 61, 62 and 63 in FIG. 4 and at 64, 65, 66 and 67 in FIG. 5. Suitable insulation walls 69 help retain the heat and thus reduce the cost of operation. Thus, the insulated, enclosed, horizontal, heated and generally tubular conveyors 11, 12 and 13 are made alike and are primarily designed to keep the material moving while retaining the individual particles at a minimum temperature within the 165° F. to 180° F. range. Thus, it will be seen that the four conveyors essentially form a common enclosed, heated, insulated receptacle in all portions of which the ground particles are kept under positive conveyor control and in positive motion, in the initial portion of which (conveyor 10) the particles are tumbled and advanced in an atmosphere exclusively of dry live steam and raised to a minimum temperature in the range of 165° F. to 180° F. and in the final portion of which (conveyors 11, 12, 13) the particles are secluded from ambient air, are kept under positive mechanical movement and are held within said minimum temperature range. After start up and reaching of a steady state condition, the rate of flow in and out of the conveyors can be and normally is continuous at a rate measured in tons per hour and when discharged from conveyor 13 is 100% salmonella free according to presently identified serotypes of salmonella and present methods for identifying such serotypes. Furthermore, such positive and continuous conveyor movement following tumbling has been discovered to give excellent heat control and insures that the material remains in particle form. Organic feed materials of high fat content have a tendency to cake or bridge if allowed to assume a static position at an elevated temperature. Moisture level is held within two percent of the total material weight and nutritional value assays show essentially no change. The process of the invention thus avoids caking and bridging, avoids moisture and nutritional changes and avoids loss of the particle form while handling tons of material on a continuous basis. Hot air processes, as previously stated, inherently cause evaporation and inherently change both moisture content and nutritional assays. Such processes, unlike the invention, also require perforate receptacles. Infrared heat has given only modest heat penetration and such heat has been entirely impractical for all prior art methods for processing ground, organic feed materials having bone particles. Vibration tables with infrared heat have proven completely unsuccessful for ridding ground, organic feed meals of salmonella. Furthermore, some of the prior art methods require that the material be pressed and compacted or that it be agitated and loosened before entering the process. In the process of the present invention the material is continuously introduced in particle form, is continuously processed while being retained in particle form and is discharged in particle form. No supplementary gas such as pressurized air or the like is required preliminary to processing.

Continuing the description, it will be noted from the schematic diagram of FIG. 2 that the tumbling, loose material particles are introduced at a rate which essentially fills conveyor 10 when tumbled whereas when moved in subsequent conveyors 11, 12, 13 the material essentially fills only half the available conveyor space. In both cases the material should however be understood as moving at the same tons per hour rate which may, for example, range from 5 to 30 tons per hour. A typical system utilizing the process employs 20 inch diameter conveyors which are 36 feet long each, have a material travel time of two minutes each and process 20 tons per hour.

Material discharged by conveyor 13 next moves into unheated, uninsulated, enclosed receptacles which form a continuation of conveyors 10, 11, 12 and 13 and which provide a final moving-cooling step. For this purpose, uncontaminated cooling ambient air is preferably drawn in at a high elevation by stack 70 or from another suitable source and mixes with the discharged and heat treated feed material particles in tube 40 to effect cooling to 120° F. or below. Tube 40 connects with a conventional cyclone type separator 71 and an air fan 72 which separates and discharges the waste air and any waste steam through pipe 73. The treated material discharges from cyclone separator 71 through another air-lock 74 and into a screw conveyor for transfer to storage, sacking and the like. Once the ground feed materials have been cooled to below 120° F. it has been discovered that motion of the particles is not required since there will then be no tendency for the particles to bridge or cake. Thus, the process leaves the material in particle form and substantially unchanged in moisture content or nutritional value.

It will be noticed that the effect of the operation of fan 72 is to pull excess steam from the conveyors 10, 11, 12 and 13. Thus, the excess steam is kept out of the material itself and contributes to a small extent to the heating of the material passing through the last conveyors 11, 12 and 13. Alternatively an air stack may be connected to the discharge end of conveyor 13 to draw off excess steam.

What is claimed is:

1. A continuous large volume, terminal heating, process for rapidly destroying salmonella carried by salmonella contaminated ground organic feed materials constituting loose particles capable of flowing freely in a stream at ambient temperature comprising the steps of:

(a) preheating to an internal temperature of at least 180° F. an enclosed heat insulated elongated first non-perforate, horizontal tubular receptacle having screw conveyor means adapted to tumble and advance said particles and having intake and discharge openings at opposite ends thereof;

(b) establishing and continuously maintaining an atmosphere within said preheated receptacle which is substantially unpressurized and exclusively dry live steam;

(c) introducing said ground feed material at ambient temperature into the said intake opening in a continuous uncompacted, unpressurized, free flowing, stream substantially unmixed with ambient air and at some predetermined large volume rate of thousands of pounds per hour, said particles being introduced in particle form of a size substantially between 20 mesh and one-quarter inch;

(d) rapidly moving said stream of material continuosly through said tubular receptacle between said openings at said large volume rate while maintaining the individual particles thereof loose, non-layered, substantially unpressurized, free of compaction, in a turbulent, tumbling type motion and in substantially constant contact with said atmosphere of exclusively dry live steam and such that said particles are rapidly heated and advanced to said discharge opening within a short steaming time period and are brought to a temperature within the range of at least 165° F. to 180° F. upon reaching said discharge opening;

(e) continuously discharging said steam heated material downwardly from said first receptacle at said large volume rate in a non-pressurized, non-compacted substantially ambient air free state directly into a series of interconnected, vertically stacked, unpressurized, enclosed, heat insulated, non-perforate, horizontal, tubular receptacles the first of said series having an intake opening connected to and forming a continuation of the discharge opening of the first receptacle, each of said series having external non-convection heating means for addition of additional external heat as required to maintain a non-static slow moving mass of loose particles of said material at a temperature within the range of at least 165° F. to 180° F. and having in each of said series screw conveyor means for keeping said mass of particles in slow positive movement;

(f) confining said material particles unpressurized in said series of screw conveyor receptacles for a retention period substantially longer in time than said steaming period and as a slowly moving mass of unpressurized, uncompacted, individual particles free of forced heated air currents therethrough and during such longer period continuously maintaining the temperature thereof at a minimum temperature within the range of 165° F. to 180° F.;

(g) continuously withdrawing the material from a discharge opening in the last of said series of receptacles at said same large volume rate such that individual material particles and the said mass formed by such particles in said series of receptacles are always kept slowly moving at a uniform rate in a non-static, unpressurized, uncompacted mass formed of separate particles and sufficiently fast to prevent particle setting up, bridging and caking and such that the total time of said particles in both said first and series of receptacles is sufficient to destroy all identifiable salmonella in said particles;

(h) continuously rapidly cooling the particles forming the material as it is continuously withdrawn from the last of said series of receptacles to a temperature of at least below 120° F. and during said continuous withdrawing and cooling and until said material has reached a temperature of at least below 120° F. maintaining said particles loose and the mass formed thereby unpressurized, uncompacted and moving at said large volume rate and sufficiently fast to prevent particle setting up, bridging and caking; and (i) following said cooling-moving step and reduction of said material temperature to below 120° F., transporting said processed material to the next operation in the form of uncompacted particles.

2. A process as claimed in claim 1 in which said steaming period is about two minutes, said retention period is about six minutes and said minimum temperature is at least 180° F.

3. A process as claimed in claim 1 in which during said cooling step said particles are moved in additional, uninsulated, enclosed tubular receptacles forming a continuation of said series of receptacles.

4. A process as claimed in claim 3 including the step of during said cooling step mixing ambient air with said particles for cooling and then separating said cooling air from said particles.

5. A process as claimed in claim 1 including the step of during said cooling step drawing ambient air from a substantially uncontaminated air location, moving said ambient air past said discharge opening in the last of said series of receptacles whereby to utilize the flow of said ambient air both to remove said particles and to draw excess steam from all of said conveyors to cause said ambient air, excess steam and particles to be mixed during said cooling step and then separating said cooling air from said particles.

6. A continuous large volume, terminal heating, process for rapidly destroying salmonella carried by salmonella contaminated ground organic feed materials constituting loose particles capable of flowing freely in a stream at ambient temperatures comprising the steps of:

(a) preheating to an internal temperature of at least 180° F. an enclosed, heat insulated, elongated, first receptacle having means for tumbling and advancing said particles between intake and discharge openings disposed at opposite ends of the path therethrough;

(b) establishing and continuously maintaining an atmosphere within said first preheated receptacle which is substantially unpressurized and exclusively dry live steam;

(c) introducing said ground feed material at ambient temperature into the said intake opening in a continuous uncompacted, unpressurized, free flowing, stream substantially unmixed with ambient air and at some predetermined large volume rate of thousands of pounds per hour, said particles being introduced in particle form of a size substantially between 20 mesh and one-quarter inch;

(d) rapidly moving said stream of material continuously in said first receptacle path between said openings at said large volume rate with said tumbling and advancing means while maintaining the individual particles thereof loose, non-layered, substantially unpressurized, free of compaction, in a turbulent, tumbling type motion and in substantially constant contact with said atmosphere of exclusively dry live steam and such that said particles are rapidly heated and advanced to said discharge opening within a short steaming time period and are brought to a temperature within the range of at least 165° F. to 180° F. upon reaching said discharge opening;

(e) continuously discharging said steam heated material from said first receptacle at said large volume rate in a non-pressurized, non-compacted, substantially ambient air free state directly into a second elongated receptacle providing an unpressurized, enclosed, heat insulated, gradually downwardly directed path connected to and forming a continuation of the path formed by the first receptacle, said second receptacle having external non-convection heating means for addition of additional external heat as required to maintain a non-static slow moving mass of loose particles of said material at a temperature within the range of at least 165° F. to 180° F. and having means for keeping said mass of particles loose and in slow positive movement;

(f) confining said material particles unpressurized in said second receptacle path for a retention period substantially longer in time than said steaming period and as a slowly moving mass of unpressurized, uncompacted, individual particles free of forced heated air currents therethrough and during such longer period continuously maintaining the temperature at a minimum temperature within the range of 165° F. to 180° F.;

(g) continuously withdrawing the material from a discharge opening at the end of said second receptacle path and at said same large volume rate such that individual material particles and the said mass formed by such particles in said second receptacle are always kept slowly moving at a uniform rate in a non-static, unpressurized, uncompacted mass formed of separate particles and sufficiently fast to prevent particle setting up, bridging and caking and such that the total time of said particles in said first and second receptacle paths is sufficient to destroy all identifiable salmonella in said particles;

(h) continuously rapidly cooling the particles forming the material as it is continuously withdrawn from said second receptacle to a temperature of at least below 120° F. and during said continuous withdrawing and cooling and until said material has reached a temperature of at least below 120° F. maintaining said particles loose and the mass formed thereby unpressurized, uncompacted and moving at said large volume rate and sufficiently fast to prevent particle setting up, bridging and caking; and (i) following said cooling-moving step and reduction of said material temperature to below 120° F., transporting said processed material to the next operation in the form of uncompacted particles.

References Cited

UNITED STATES PATENTS

| | | | |
|---|---|---|---|
| 3,232,770 | 2/1966 | Schack et al. | 99—182 |
| 3,427,954 | 2/1969 | Long | 99—251 |
| 2,679,457 | 5/1954 | Shaw | 99—7 |
| 2,909,984 | 10/1959 | Rycraft et al. | 99—235 |
| 3,159,493 | 12/1964 | Japikse et al. | 99—216 |
| 3,159,494 | 12/1964 | Lawrence et al. | 99—216 |
| 3,215,539 | 11/1965 | Landy | 99—221 |
| 3,252,402 | 5/1966 | Burmeister | 99—235 X |
| 3,458,326 | 7/1969 | Nicolaus et al. | 99—235 |

FOREIGN PATENTS 687,140 12/1939 Germany.

OTHER REFERENCES

Dorland Illustrated Medical Dictionary (1961), p. 1302.

NORMAN YUDKOFF, Primary Examiner

K. P. VAN WYCK, Assistant Examiner

U.S. Cl. X.R.

99—2 R